Nov. 24, 1970     K. E. DEMOREST     3,541,875
SELF-LUBRICATING GEARS AND OTHER MECHANICAL PARTS
Filed May 26, 1969                2 Sheets-Sheet 1
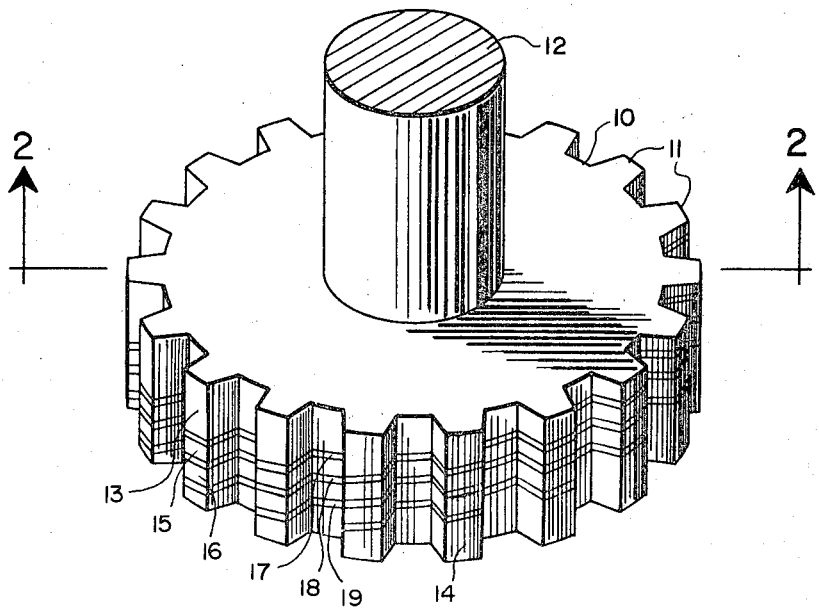
FIG. 1
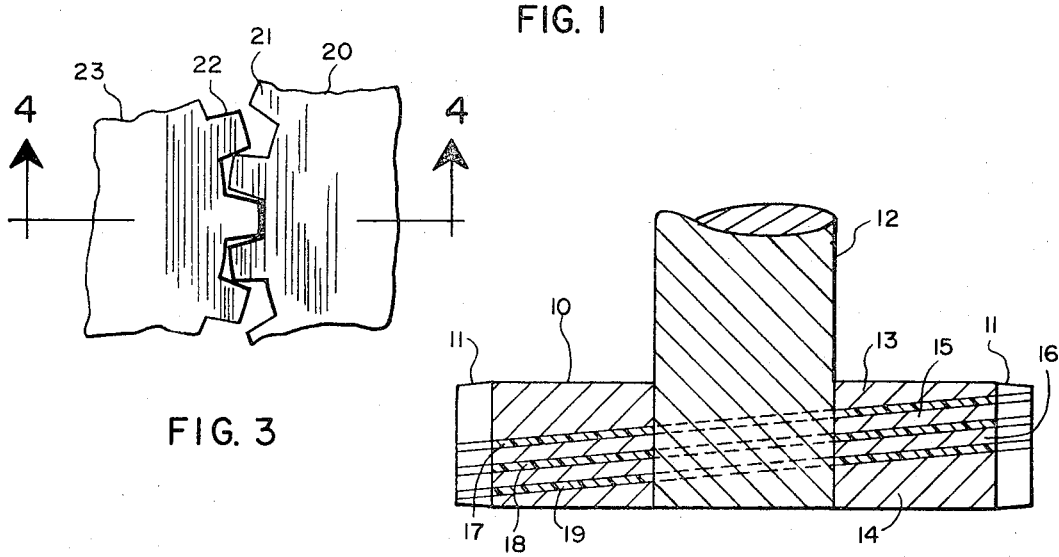
FIG. 3
FIG. 2
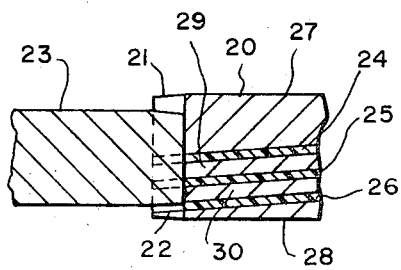
FIG. 4
*INVENTOR*
KEITH E. DEMOREST
BY
*ATTORNEYS*

Nov. 24, 1970  K. E. DEMOREST  3,541,875
SELF-LUBRICATING GEARS AND OTHER MECHANICAL PARTS
Filed May 26, 1969  2 Sheets-Sheet 2

INVENTOR
KEITH E. DEMOREST
BY
Joseph H. Beumer
ATTORNEYS

United States Patent Office 3,541,875
Patented Nov. 24, 1970

3,541,875
SELF-LUBRICATING GEARS AND OTHER MECHANICAL PARTS
Keith E. Demorest, Huntsville, Ala., assignor to the United States of America as represented by the Administrator of the National Aeronautics and Space Administration
Filed May 26, 1969, Ser. No. 827,579
Int. Cl. F16h 55/12, 57/04
U.S. Cl. 74—468        7 Claims

ABSTRACT OF THE DISCLOSURE

Gears and other mechanical parts having surfaces adapted to engage in frictional contact are constructed of alternating layers of metal and a dry-lubricant-containing material bonded into a laminated composite body. The lubricating layers extend through the body of the part so that exposed portions thereof form a part of the contacting surfaces. Disposition of the lubricating layers diagonally with respect to contacting surfaces provides for continuous distribution of a lubricating film by lateral movement of the exposed lubricating portion over the opposing surface with rotation of the part.

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

This invention relates to rotating mechanical parts subject to frictional wear and more particularly to gears, journals and the like.

One of the problems presented in the operation of mechanical devices such as gear trains in the environment of outer space is the provision of effective lubrication. Conventional fluid lubricants cannot be used without hermetic sealing since fluid lubricants undergo rapid volatilization in vacuum, along with radiation-induced degradation of organic constituents.

Previous approaches to non-fluid lubrication have included the use of solid-film lubricants bonded to the contacting surface of metal parts or fabrication of the part from a self-lubricating material such as nylon or teflon. Each of these approaches presents a serious limitation. Solid-film lubricants, while effective for short-term use, exhibit a limited wear life, and the underlying metal surface is eventually exposed. Parts fabricated from self-lubricating material offer limited load-carrying capability inasmuch as self-lubricating plastics are considerably weaker than metals. For certain long-term applications in space both a long wear life and a high strength are desired.

SUMMARY OF THE INVENTION

In the present invention gears and other rotating mechanical parts having surfaces adapted to engage in frictional contact are constructed of alternating layers of metal and at least one layer of a dry-lubricant containing material bonded into a laminated composite body. The lubricating layers extend through the body, and the contacting surface includes alternating metal and lubricating-material portions. The lubricating layers are preferably disposed diagonally with respect to the plane of the part so that the position of exposed lubricating portions of the part at the contacting surface varies laterally as the part rotates and lubricant is continuously distributed over the opposing surface. Gears and other parts embodying the invention show a prolonged wear life under space environmental conditions and a much higher load carrying capacity than previously used parts fabricated from self-lubricating materials.

It is therefore an object of this invention to provide self-lubricating mechanical parts.

Another object is to provide self-lubricating gear bodies having a high load-carrying capacity.

Still another object is to provide self-lubricating gears which exhibit a long wear life in vacuum.

Other objects and advantages of the invention will be apparent from the following detailed description and the accompanying drawings.

BRIEF DESCRIPTION OF THE DRAWINGS

In the drawings:

FIG. 1 is a perspective view of a gear wheel embodying the invention, the gear wheel being mounted on a shaft;

FIG. 2 is a sectional view taken along line 2—2 in FIG. 1;

FIG. 3 is a fragmentary side view of a gear wheel embodying the invention enmeshed with a conventional gear wheel;

FIG. 4 is a sectional view taken along line 4—4 in FIG. 3;

DESCRIPTION OF THE PREFERRED EMBODIMENT

Figure 5:
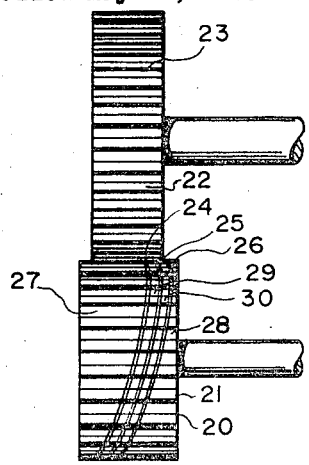
FIG. 5 is an elevational view of the enmeshed gears shown in FIGS. 3 and 4.

Referring to FIG. 1 and FIG. 2 in the drawings there is shown a circular gear wheel 10 having projecting teeth 11 disposed around the periphery thereof. The gear wheel 10 is shown mounted on shaft 12 adapted for rotation. The body of gear wheel 10 includes outer portions 13 and 14 of metal and metal layers 15 and 16 disposed between layers 17, 18 and 19 of solid lubricant-containing material, the layered structure being bonded together into a laminated compact. Layers 17, 18 and 19 of lubricant-containing material and metal layers 15 and 16 extend diagonally through the gear wheel so that the location of exposed portions of lubricant-containing material with respect to the edges of the gear at a given point of contact with an opposing gear varies as the gear wheels rotate. Layers 15 through 19 have a substantially uniform thickness throughout the body of the gear wheel, but outer metal portions 13 and 14 are wedge-shaped to compensate for slanting of layers 15 through 19 and to give the gear wheel a cylindrical configuration.

FIGS. 3 and 4 show laminated gear wheel 20 having its teeth 21 meshed with mating teeth 22 of a conventional gear wheel 23. Gear wheel 20 has layers 24, 25 and 26 of solid lubricant containing material disposed between outer metal portions 27 and 28 and inner metal layers 29 and 30 with all of the layers extending through the body of the gear wheel. In this embodiment at least one of gear wheels 20 and 23 is provided with an odd number of teeth so that each tooth will be enmeshed with a different opposing gear tooth each time that the gears rotate. Since the lubricating layers are slanted, the areas of contact between exposed portions of lubricant-containing material and the conventional gear teeth will be varied with each rotation and a lubricating film will be continuously transferred to exposed metal surfaces where the gear teeth come into contact.

As shown in FIG. 5, the laminated gear wheel 20 embodying the invention is thicker than the conventional gear wheel 23 with which it is enmeshed. The extra thickness of gear wheel 20 is provided so that the outermost lubricating layers 24 and 26 extend to the edges of the meshing gear teeth 22 during rotation. If the thickness of gear wheel 20 were the same or less than the thickness of gear wheel 23 the edges of gear teeth 22 would not receive sufficient lubrication inasmuch as lubricating layers 24 and 26 do not extend entirely to the edges of gear wheel 20.

Figure 6:
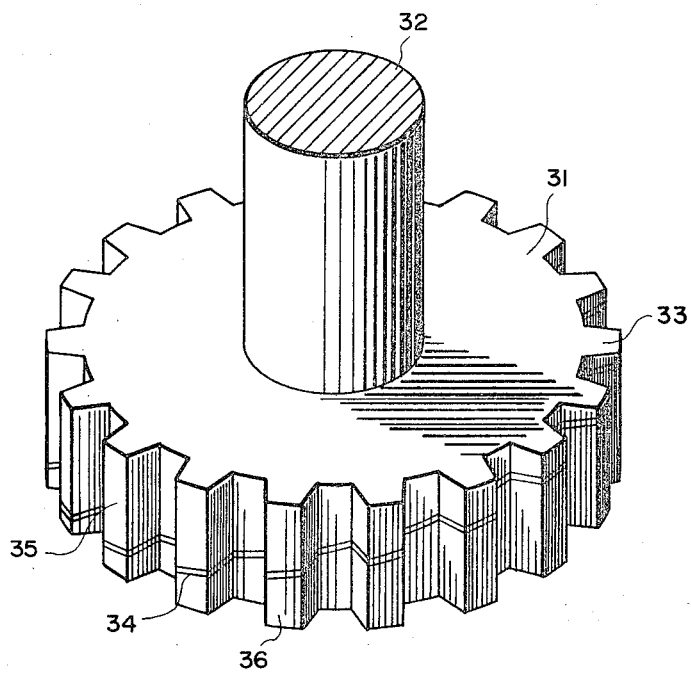
FIG. 6 is a perspective view of a gear wheel having only one layer of lubricant-containing material.

FIG. 6 shows an embodiment wherein a gear wheel is provided with only one layer of lubricating material. Gear wheel 31 shown mounted on shaft 32 has teeth 33 projecting around the periphery thereof. Gear wheel 31 includes a layer 34 of solid lubricant-containing material bonded to upper metal portion 35 and lower metal portion 36. Lubricating layer 34 extends diagonally from a position near the lower edge of the gear wheel 31 on one side thereof to a position near the upper edge on the opposite side.

Figure 7:
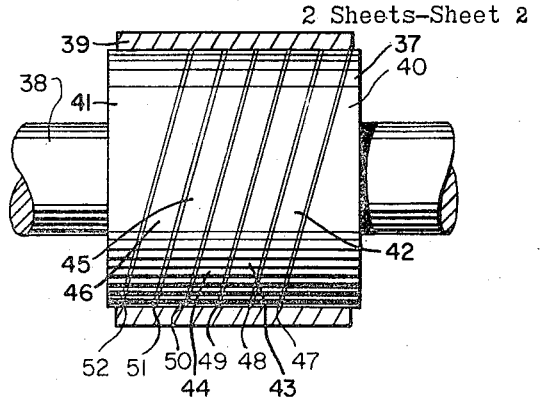
FIG. 7 is a side elevational view, partly broken away, showing a rotating shaft journal embodying the invention.

FIG. 7 shows a journal 37 fixedly mounted on a rotatable shaft 38 and disposed within a bearing member 39 for rotation therein. The cylindrical shaped journal 37 is made up of wedge-shaped metal end portions 40 and 41, metal layers 42 through 46 of uniform thickness disposed between the metal end portions and solid lubricant-containing layers 47 through 52 sandwiched between and bonded to the metal layers and end portions at each interface. Upon rotation of the journal the exposed portions of lubricating layers 47 through 52 move laterally with respect to the surface of bearing member 39 and continuously distribute a film of lubricant over the entire bearing surface.

The solid lubricant containing layers for parts embodying the invention include a solid film lubricant and other components as required for structural strength and for formation of a bond between these layers and the adjoining metal portions. A preferred composition for the lubricating layers is a mixture of a fluorocarbon polymer such as Teflon with a suitable reinforcing material such as metal powder or fiber glass. In particular, the Teflon-bronze powder mixture available commercially from Allegheny Plastics Company under the trade name "Salox M" can be used. This material, prepared by the manufacturer in the form of a thin sheet, can be bonded to metal surfaces by adhesives such as epoxy resins or by other methods such as diffusion bonding. Other solid lubricants such as compacted molybdenum disulfide can also be used. Graphite can be used as the lubricating material for some applications, but it is not suitable for use under vacuum conditions.

The lubricant-containing layers can also be prepared by mixing a dry film lubricant such as finely divided Teflon or molybdenum sulfide with a curable resin or enamel, applying the mixture by spraying or brushing to the desired thickness on the surface of one metal layer, placing the adjoining metal surface in contact with the applied lubricating layer and allowing the resin or enamel to cure. Some curable resins, in particular polyamides, can serve a dual purpose in that they form a strong bond with metals, and, once cured, they act as a dry film lubricant. Other methods which can be used include mixing a lubricating powder, for example, molybdenum disulfide, with a sinterable metal powder and bonding such mixture to the adjoining metal layers by sintering or diffusion bonding.

Although the invention is not to be understood as limited to particular dimensions, the thickness of the lubricating layers is preferably kept to a minimum in order to provide maximum strength in the fabricated part. For laminated gears embodying this invention, a lubricating layer thickness about $\frac{1}{16}$ inch gives best results.

The metal portions of gears and journals embodying the invention can be made up of any metal having a surface suitable for bonding, and high-strength steels which have been employed previously for conventional gear wheels are preferred.

While the invention is described above with respect to gear wheels and journals, it is to be understood that the scope of the invention includes other rotating mechanical parts having surfaces adapted to engage in frictional contact. In addition various changes and modifications in the embodiments described above can be employed without departing from the scope of the invention. For example, the means employed for mounting of gear wheels on shafts and the size and spacing of gear teeth can be varied widely.

What is claimed is:

1. In a generally cylindrical, rotatable metal part having surfaces at the periphery thereof adapted to engage in frictional contact with surfaces of other parts, the improvement which comprises at least one layer of solid-lubricant containing material disposed diagonally through the entire body of said rotatable part and bonded to the adjoining metal portions, said lubricant-containing layer being so disposed that exposed portions of the edge thereof are included in said surfaces adapted to engage in frictional contact.

2. A gear wheel comprising a generally cylindrical body having teeth around the periphery thereof, said body including a pair of outer, wedge-shaped metal portions and at least one layer of solid lubricant-containing material of uniform thickness disposed between and bonded to said metal portions, said lubricant-containing layer extending diagonally through said body so that exposed portions of the edge thereof are included in the contacting surface of said teeth, the location of said exposed portions of said lubricating layer varying from a position near one lateral edge of said gear at one point of the periphery thereof to a position near the opposite lateral edge at a point on the periphery opposite to said first point.

3. The gear wheel of claim 2 including at least two of said layers of lubricant-containing material and at least one metal layer of uniform thickness disposed between and bonded to said layers of lubricant-containing material.

4. The combination of the gear wheel of claim 3 and a second gear wheel having its teeth enmeshed therewith, said second gear wheel being thinner than said gear wheel of claim 3 to the extent that the lateral edges of said second gear are in contact with said exposed portion of lubricant-containing layers at some point during each revolution of said gears, at least one of said gears having an odd number of teeth.

5. The gear wheel of claim 2 wherein said lubricant-containing layer comprises a sheet of a mixture of polytetrafluoroethylene and bronze powder bonded to said metal with an adhesive.

6. A journal comprising a generally cylindrical body mounted on a shaft and adapted for rotation within a bearing, said body including a pair outer, wedge-shaped metal portions and at least one layer of solid lubricant-containing material disposed between and bonded to said metal portions, said lubricant-containing layer extending diagonally through said body so that the peripheral edge thereof forms a part of the surface in contact with said bearing, the location of said edge with respect to the ends of said journal varying from a position near one end at one point on the periphery of said journal to a position near the opposite end at a point on the periphery opposite to said first point.

7. The journal of claim 6 including at least two of said layers of lubricant-containing material and at least one metal layer of uniform thickness disposed between and bonded to said layers of lubricant-containing material.

References Cited

UNITED STATES PATENTS

| | | | |
|---|---|---|---|
| 1,981,782 | 11/1934 | D'Aubigne | 74—445 |
| 1,999,062 | 4/1935 | Sherman | 74—445 |
| 3,051,535 | 8/1962 | Klint et al. | 308—240 |
| 3,350,143 | 10/1967 | Lichowsky | 308—240 X |

LEONARD H. GERIN, Primary Examiner

U.S. Cl. X.R.

74—445